United States Patent
Lan et al.

(10) Patent No.: US 12,325,175 B2
(45) Date of Patent: Jun. 10, 2025

(54) THERMOPLASTIC TUBE BENDING METHOD

(71) Applicant: SANOH INDUSTRIAL CO., LTD., Tokyo (JP)

(72) Inventors: Guang Ping Lan, Koga (JP); Kazuhiko Nakazato, Koga (JP); Takaaki Habu, Koga (JP); Kazuki Yasuraoka, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 298 days.

(21) Appl. No.: 17/629,941

(22) PCT Filed: Apr. 6, 2020

(86) PCT No.: PCT/JP2020/015461
§ 371 (c)(1),
(2) Date: Jan. 25, 2022

(87) PCT Pub. No.: WO2021/024549
PCT Pub. Date: Feb. 11, 2021

(65) Prior Publication Data
US 2022/0288840 A1    Sep. 15, 2022

(30) Foreign Application Priority Data
Aug. 8, 2019  (JP) .................. 2019-145893

(51) Int. Cl.
*B29C 53/84*  (2006.01)
*B29C 37/00*  (2006.01)
(Continued)

(52) U.S. Cl.
CPC .............. *B29C 53/84* (2013.01); *B29C 37/00* (2013.01); *B29C 53/083* (2013.01);
(Continued)

(58) Field of Classification Search
CPC ................. B29C 53/083; B29C 53/84; B29K 2101/12; B29L 2023/004
See application file for complete search history.

(56) References Cited

U.S. PATENT DOCUMENTS 2,357,605 A  *  9/1944  Bruce ....................... B21D 7/06
                                                         72/403
11,465,190 B2    10/2022  Lan et al.
(Continued)

FOREIGN PATENT DOCUMENTS

CN        109109300 A  *  1/2019  ........... B29C 53/083
EP          0715568 B1  *  5/1999  ........... B29C 53/083
(Continued)

OTHER PUBLICATIONS

International Search Report of the International Searching Authority mailed Jun. 23, 2020 issued in corresponding International Application No. PCT/JP2020/015461 (and English translation).

*Primary Examiner* — Seyed Masoud Malekzadeh
*Assistant Examiner* — Vipul Malik
(74) *Attorney, Agent, or Firm* — Posz Law Group, PLC

(57) ABSTRACT

A thermoplastic tube bending method suppresses springback after the processing by a highly safe and short bending step. The thermoplastic tube bending method includes a step S1 of preheating the thermoplastic tube, a step S2 of bending the preheated thermoplastic tube by using a forming mold, and a step S3 of forming the bent thermoplastic tube by temperature control of an electric heater provided to the forming mold.

6 Claims, 12 Drawing Sheets

(51) Int. Cl.
*B29C 53/08* (2006.01)
*B29K 701/12* (2006.01)
*B29L 23/00* (2006.01)

(52) U.S. Cl.
CPC ...... *B29C 2037/90* (2013.01); *B29K 2701/12* (2013.01); *B29L 2023/22* (2013.01)

(56) References Cited

U.S. PATENT DOCUMENTS

| | | | |
|---|---|---|---|
| 2004/0258789 A1* | 12/2004 | Phillips | B29C 53/083 425/384 |
| 2020/0009782 A1* | 1/2020 | Tichy | B29C 53/84 |
| 2020/0406508 A1* | 12/2020 | White | B29C 33/04 |

FOREIGN PATENT DOCUMENTS

| | | | | |
|---|---|---|---|---|
| JP | S59-164711 U | | 11/1984 | |
| JP | H04-267136 A | | 9/1992 | |
| JP | 2001-009902 A | | 1/2001 | |
| JP | 2017154280 A | * | 9/2017 | ............. B29C 53/08 |

* cited by examiner (a)

(b)

(a)

(b)

THERMOPLASTIC TUBE BENDING METHOD

CROSS REFERENCE TO RELATED APPLICATIONS

This application is a U.S. national stage of International Patent Application No. PCT/JP2020/015461 filed on Apr. 6, 2020 and is based on Japanese Patent Application No. 2019-145893 filed on Aug. 8, 2019 the disclosures of which are incorporated herein by reference.

TECHNICAL FIELD

The present invention relates to a thermoplastic tube bending method, and more particularly to a thermoplastic tube bending method that suppresses springback after the bending.

BACKGROUND ART

Bending processes performed in a heated atmosphere are well known as the method of bending a thermoplastic tube into a three-dimensionally bent form such as a fuel pipe that is a car component, for example.

In a bending method that takes place in a heated atmosphere, a straight thermoplastic tube is fitted into a bending mold, this bending mold being then put into an atmosphere furnace with the temperature raised to a predetermined level, so as to heat the thermoplastic tube to be bent to conform to the mold and to form the same into a predetermined shape.

Such a bending method using a heated atmosphere requires a considerably long time (about 20 minutes) since when the bending mold is put into the atmosphere furnace until when a predetermined forming temperature (about 165° C.) is reached, and is poor in energy efficiency and productivity.

Accordingly, there have been developed techniques that use infrared radiation for the heating of thermoplastic tubes (for example, PTL 1). Another heating method that has been considered causes a high-temperature, high-pressure fluid (steam) to flow into the thermoplastic tube (for example, PTL 2).

CITATION LIST

Patent Literature

[PTL 1] Japanese Patent Application Publication No. H4-267136
[PTL 2] Japanese Patent Application Publication No. 2001-9902

SUMMARY OF INVENTION

Technical Problem

However, with the former method that uses infrared for the heating, the quality in terms of, for instance, shape can hardly be ensured because of the unfeasibility to heat the entire tube uniformly due to inevitable unevenness in the infrared irradiation. The latter heating method that uses steam may have safety issues entailing the risk of burn injuries in the event of steam leakage.

The present invention has been made in view of the problems encountered in the background art as described above, an object thereof being to provide a thermoplastic tube bending method that suppresses springback after the processing by a highly safe and short-time bending process and that can produce a thermoplastic tube with a high shape quality.

Solution to Problem

To achieve the above object, the present invention provides a thermoplastic tube bending method as set forth in [1] to [6] below.

[1] A thermoplastic tube bending method including:
a step of preheating a thermoplastic tube;
a step of bending the preheated thermoplastic tube by using a forming mold; and
a step of forming the bent thermoplastic tube, wherein the forming step is performed by temperature control of an electric heater provided to the forming mold.

[2] The thermoplastic tube bending method according to [1] above, wherein, in the forming step, the bent thermoplastic tube is held at a crystallization temperature or higher and a melting-point temperature or lower for a predetermined time by temperature control of the electric heater.

[3] The thermoplastic tube bending method according to [1] or [2] above, wherein the forming step includes a step of gradually cooling the bent thermoplastic tube at a crystallization temperature or higher and a melting-point temperature or lower by temperature control of the electric heater.

[4] The thermoplastic tube bending method according to any one of [1] to [3] above, wherein the preheating step is performed with residual heat of the forming mold.

[5] The thermoplastic tube bending method according to any one of [1] to [4] above, wherein the forming mold includes XY-plane forming molds that are clamped in an X direction to bend the thermoplastic tube in an XY plane, and Z-direction forming molds that are clamped in a Z direction to bend the thermoplastic tube in the Z direction, and wherein both of the forming molds, when clamped, together define a cavity therebetween for forming the thermoplastic tube bent three-dimensionally in X, Y, and Z directions.

[6] The thermoplastic tube bending method according to [5] above, wherein the Z-direction forming molds are a pair of forming molds clamped in the Z direction and having opposing distal end surfaces each formed with a forming recess, which, when the forming molds are clamped, define the cavity therebetween for forming the thermoplastic tube bent three-dimensionally in X, Y, and Z directions, and wherein the electric heater is embedded in the Z-direction forming molds.

Advantageous Effects of Invention

With the thermoplastic tube bending method according to the present invention described above, the forming process is performed by the temperature control of the electric heater provided to the forming mold, so that the temperature can be raised quickly and controlled safely. Therefore, the thermoplastic tube bending process can be performed in a short time and highly safely, without requiring large scale equipment such as a furnace.

The forming step, in particular, where the thermoplastic tube that has been bent is held at the crystallization temperature or higher and a melting-point temperature or lower for a predetermined time by the temperature control of the electric heater, accelerates crystallization of the thermoplastic tube, which allows bending with little springback afterwards to be readily realized, so that thermoplastic tubes with a good shape quality can be achieved.

DESCRIPTION OF EMBODIMENTS

One embodiment of a thermoplastic tube bending method according to the present invention will be hereinafter described in detail. Note, the following description of the preferred embodiment is essentially merely an illustration and not intended to limit the present invention to this embodiment.

The bending method according to the present invention is applicable to thermoplastic tubes, and can be applied to various tubes, hoses, and pipes made of thermoplastic resin.

The thermoplastic tube is a tube with a circular section having the inside and outside diameters substantially uniform from one end to the other and can be single layered or multilayered. The thermoplastic tube may have an outside diameter of about 4 to 40 mm and a thickness of about 0.5 to 3 mm, and may be used, for example, for fluid communication between a fuel injection pipe and a fuel tank of a car, or as a connection pipe for feeding fuel to the engine, cooling water pipe, a pipe that leads to a heater unit, an air hose, and the like.

Examples of resin materials that constitute the thermoplastic tube are, for example, polyamide resins, polyethylene resins, polypropylene resins, polyethylene terephthalate resins, fluorocarbon resins, and the like. The tube is produced from these resin materials by extrusion forming. Several resin materials may be extruded in layers so that the tube has a multilayered structure. Among the resins listed above, polyamide resin has excellent resistance to chemicals and heat, and therefore is suitable as a material for the tube used as a fuel pipe.

The present invention relates to a method of bending the thermoplastic tubes described above, which includes a step of preheating a thermoplastic tube, a step of bending the preheated thermoplastic tube, and a step of forming the bent thermoplastic tube.

Figure 1:
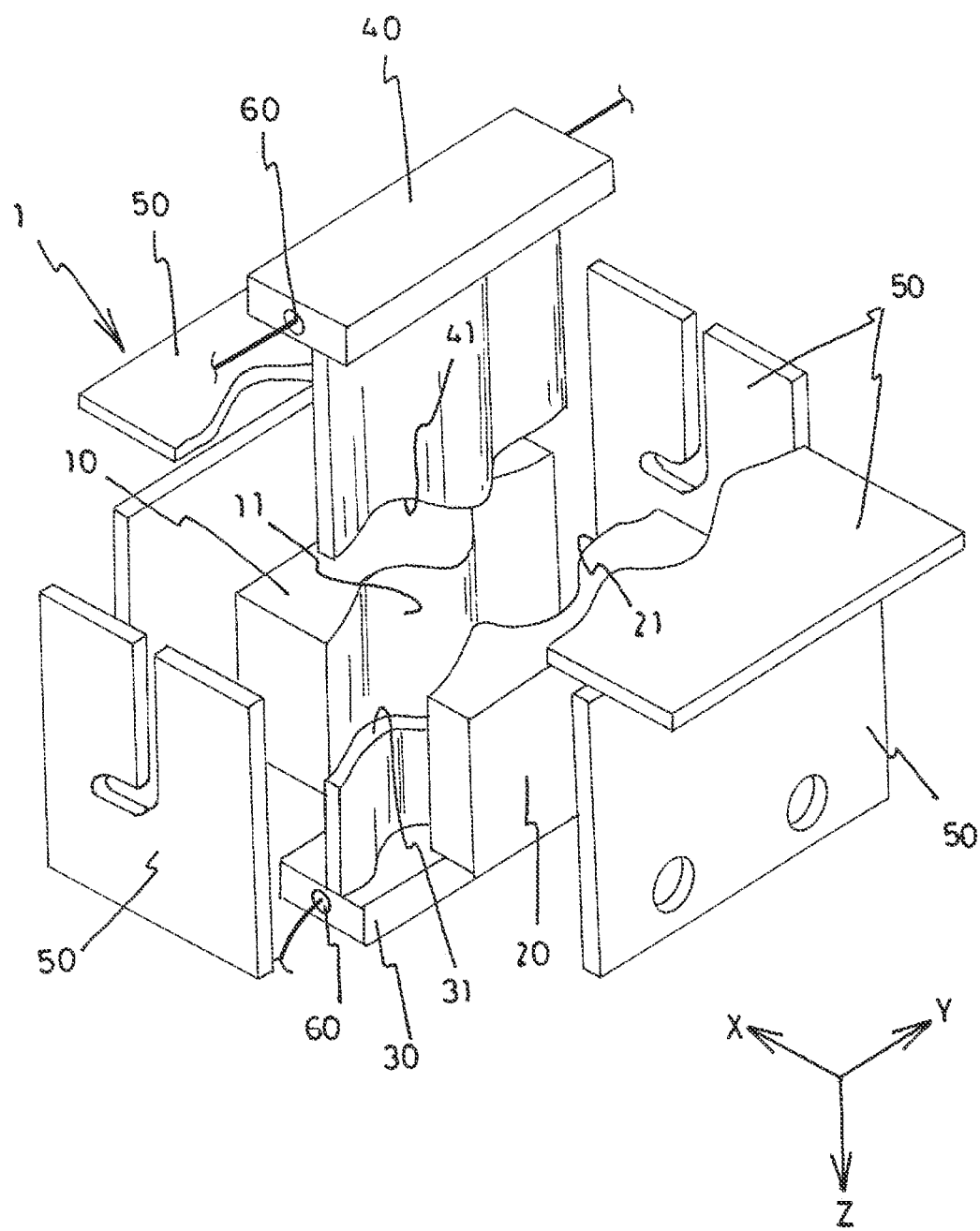
FIG. 1 is an exploded perspective view of a conceptual illustration of one example of a forming mold used in a thermoplastic tube bending method according to the present invention.
Figure 2:
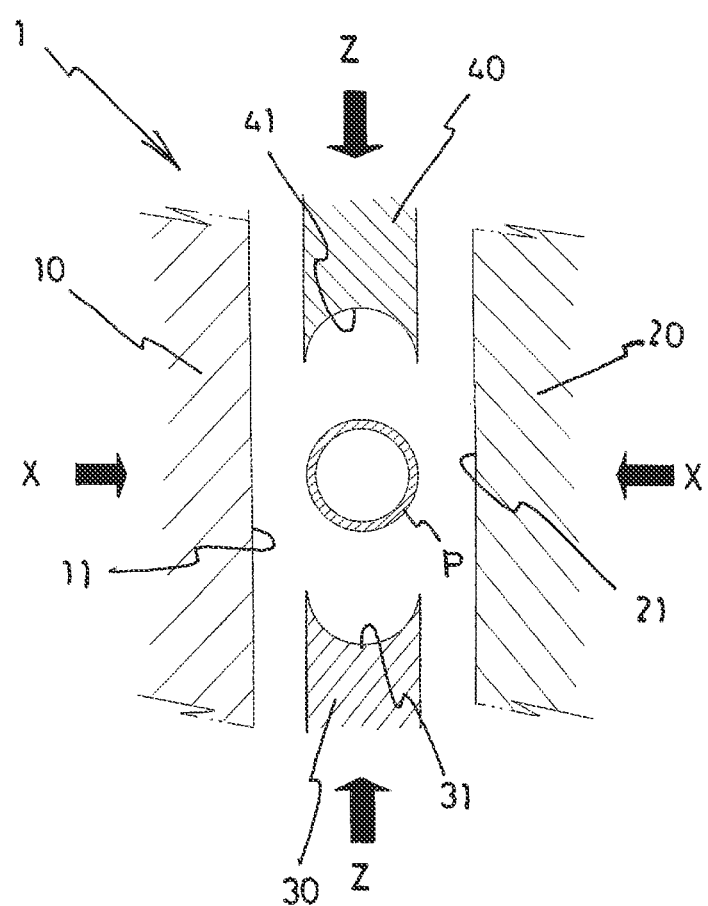
FIG. 2 is a conceptual cross-sectional view of major parts of the forming mold shown in FIG. 1.

The present invention uses a forming mold, which may be the one illustrated in FIG. 1 and FIG. 2, for example.

The illustrated forming mold 1 is made up of XY-plane forming molds 10 and 20 that are clamped in an X direction to bend a thermoplastic tube P in an XY plane, Z-direction forming molds 30 and 40 that are clamped in a Z direction to bend the thermoplastic tube P in the Z direction, and thermal insulation walls 50 that surround the outside of these forming molds. The Z-direction forming molds 30 and 40 are each provided with a temperature-controlled electric heater 60.

The XY-plane forming molds 10 and 20 are a pair of forming molds that are clamped in the X direction by actuators (not shown), being formed with forming surface 11 and 21 respectively on opposite plate surfaces for bending the thermoplastic tube P in the X and Y directions. The forming surfaces 11 and 21 are curved in the X and Y directions conforming to the projected shape of the product, or the final shape of the thermoplastic tube P that is bent three-dimensionally in X, Y, and Z directions, on the XY plane, while being straight and flat along the Z direction.

This pair of XY-plane forming molds 10 and 20, when clamped, define a gap or cavity substantially equal to the outside diameter of the thermoplastic tube P to be bent between the opposite forming surfaces 11 and 21, so as to bend the thermoplastic tube P in the X and Y directions in the XY plane.

The pair of XY-plane forming molds 10 and 20 may both be configured to be able to move back and forth in the X direction, or, one of them may be fixed while the other may be configured as a movable mold that moves back and forth in the X direction relative to the fixed mold.

The Z-direction forming molds 30 and 40 are a pair of forming molds that are clamped in the Z direction by actuators (not shown), too. The pair of Z-direction forming molds 30 and 40 are plate bodies with a thickness and shape that allow these to be inserted from the Z direction into the cavity mentioned above defined between the opposite forming surfaces 11 and 21 of the closed pair of XY-plane forming molds 10 and 20, i.e., the thickness being substantially equal to the outside diameter of the thermoplastic tube P, and with a plate surface curved in the X and Y directions in a shape conforming to the projected shape of the thermoplastic tube P product on the XY plane. The opposing distal ends of the plates are curved in the Z direction such as to conform to the shape of the thermoplastic tube P product.

The opposing distal end surfaces of this pair of Z-direction forming molds 30 and 40 are respectively formed with forming recesses 31 and 41 that define a cavity therebetween when clamped as illustrated in FIG. 2 for forming the thermoplastic tube P bent three-dimensionally in the X, Y, and Z directions.

The pair of Z-direction forming molds 30 and 40 may both be configured to be able to move back and forth in the Z direction, or, one of them may be fixed while the other may be configured as a movable mold that moves back and forth in the Z direction relative to the fixed mold.

The pair of XY-plane forming molds 10 and 20, and the pair of Z-direction forming molds 30 and 40, should preferably be made of metal such as aluminum, brass, or the like, because of durability and good dimensional precision. Aluminum, in particular, is more preferable from the viewpoints of heat conductivity and cost.

The thermal insulation walls 50 mentioned above may be any walls that cover the surroundings of the forming molds 10, 20, 30, and 40 so that they can form a substantially closed atmospheric space enclosing the entire forming molds therein. The box-like thermal insulation walls 50 made up of a plurality of plate members to compactly cover the surroundings of all the forming molds as in the illustrated embodiment are preferable from the viewpoints of material costs, installation space, and energy efficiency. The material that forms the thermal insulation walls 50 is not limited to a particular one. The walls may be made of a material that is heat-insulating itself, such as sintered quartz, asbestos, fireproof heat-insulating brick, calcium silicate and the like, or plate-like members layered to form gaps therein to provide heat insulation.

The electric heaters 60 provided to each of the pair of Z-direction forming molds 30 and 40 described above are sheathed heaters, cartridge heaters and the like, for example, and servo-controlled, in a configuration in which the heaters are each embedded in the base parts of the Z-direction forming molds 30 and 40, and the switching, i.e., ON/OFF, or amount of power is controlled based on the temperatures detected by temperature sensors (not shown) embedded near the forming recesses 31 and 41, or in a configuration in which the switching, i.e., ON/OFF, or amount of power is controlled based on the temperature detected by an atmospheric temperature sensor provided to detect the temperature of the atmosphere inside the thermal insulation walls 50 described above.

Figure 7:
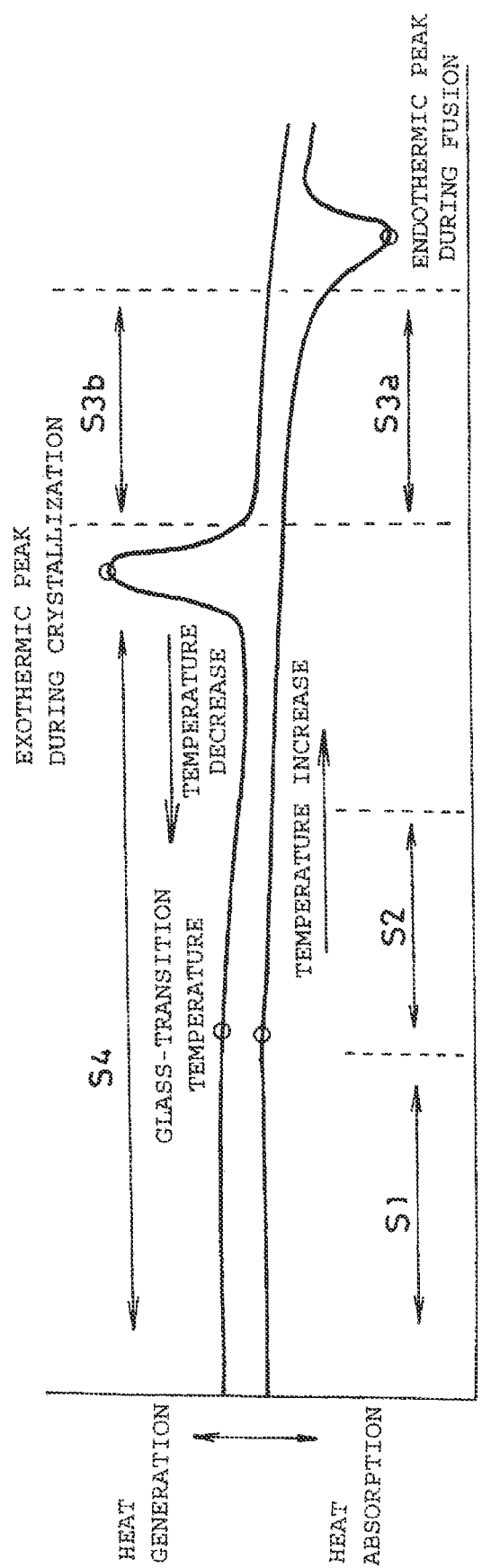
FIG. 7 is a diagram illustrating DSC curves of one embodiment of various steps in the thermoplastic tube bending method according to the present invention.

With the thermoplastic tube bending method according to the present invention, the thermoplastic tube P is bent through temperature control in various steps as described below and as shown in FIG. 7, for example, using the forming mold 1 described above.

Figure 3:
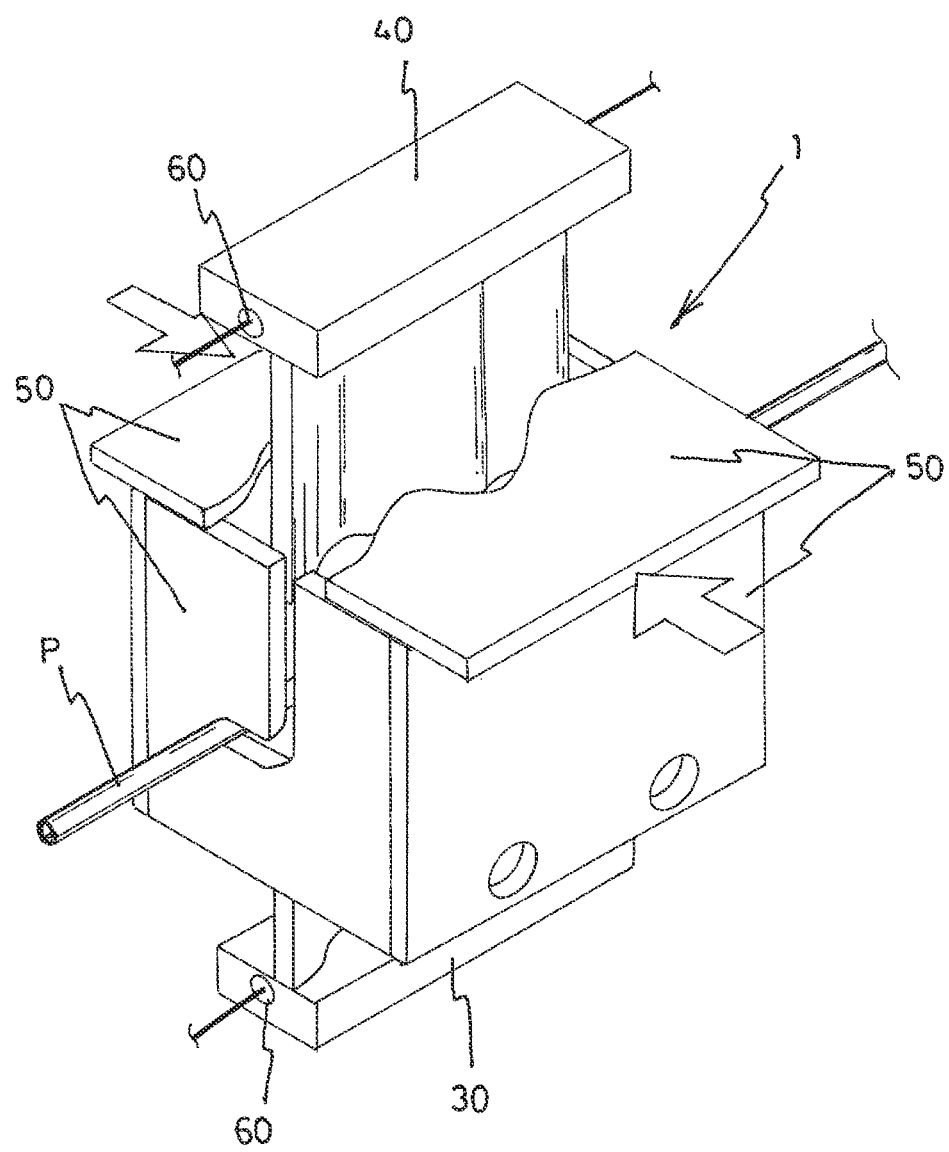
FIG. 3 is a perspective view of a conceptual illustration of one embodiment of a preheating process in the thermoplastic tube bending method according to the present invention.

First, as illustrated in FIG. 3, a straight thermoplastic tube P is set in the forming mold 1, and the upper thermal insulation wall 50 is closed.

The thermoplastic tube P set in the forming mold 1 is preheated to a predetermined temperature by being heated from all around with the residual heat of each of the forming molds 10, 20, 30, and 40 that are surrounded by the thermal insulation walls 50. This preheating step S1 (see FIG. 7) is a step of softening the straight thermoplastic tube P to facilitate the following bending process using the forming mold 1 with good precision, and it is preferable to heat the thermoplastic tube P to nearly the glass-transition temperature. This preheating temperature is suitably set in accordance with specifics of the resin material of the thermoplastic tube P. When a polyamide resin such as nylon is employed as the resin material, for example, the thermoplastic tube P need only be heated to about 30° C. to 40° C. In a configuration where it is hard to preheat the tube up to a predetermined temperature with only the residual heat of the forming molds 10, 20, 30, and 40, the electric heaters 60 embedded in the forming mold may be powered to assist the heating.

Figure 4:
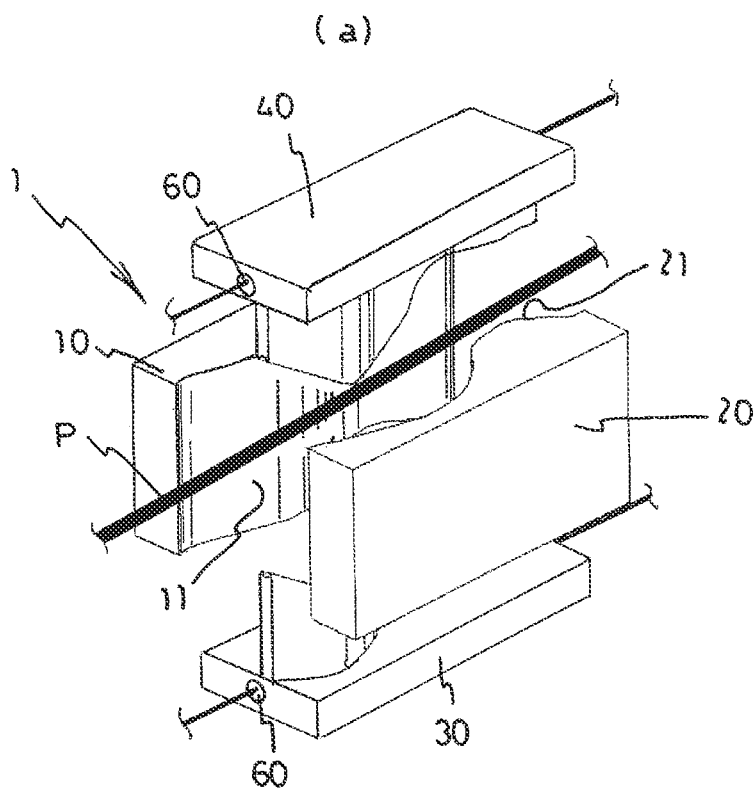
FIG. 4 is a perspective view of a conceptual illustration of one embodiment of a bending process in the thermoplastic tube bending method according to the present invention, (a) being a diagram illustrating a step in which a thermoplastic tube is set into the forming mold, and (b) being a diagram illustrating a bending step in which the thermoplastic tube is bent in X and Y directions.
Figure 4:
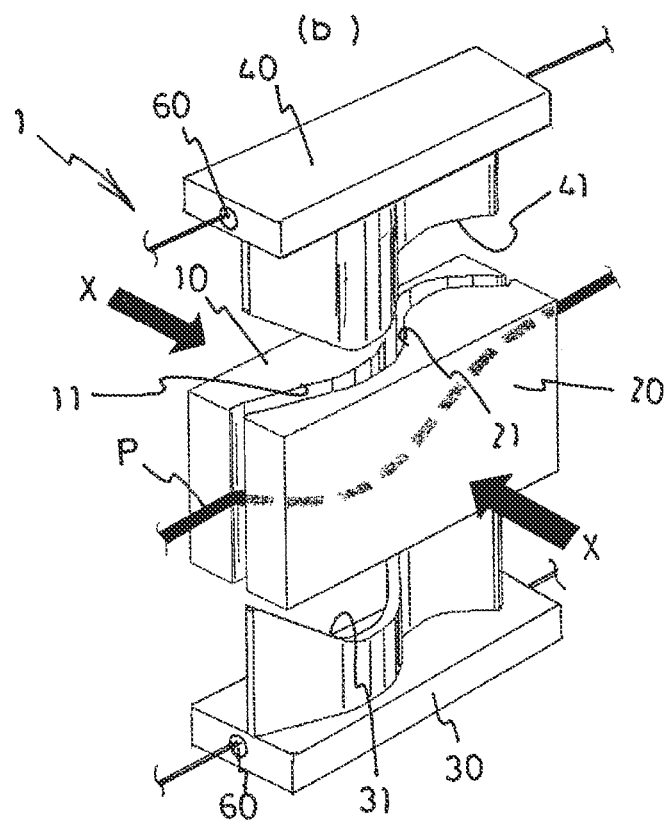
Figure 5:
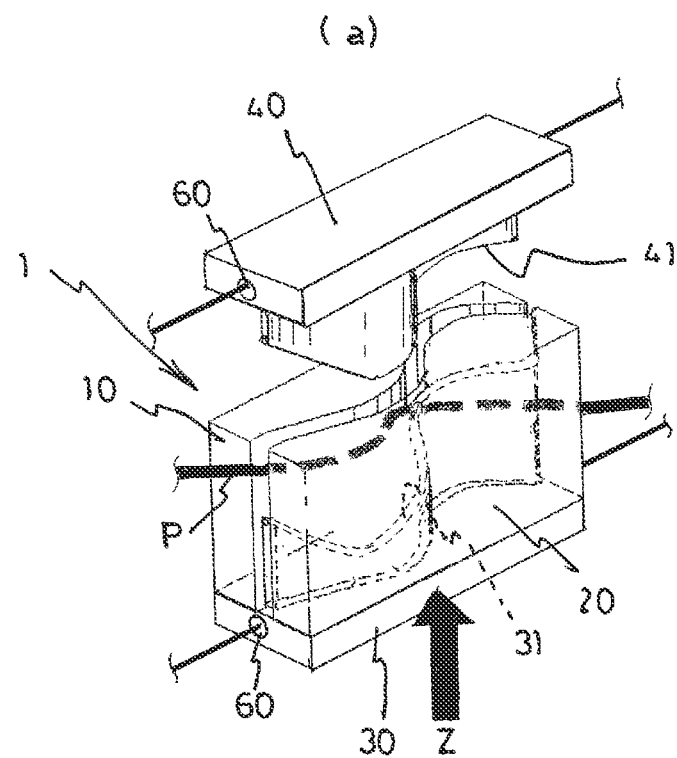
FIG. 5 is a perspective view of a conceptual illustration of one embodiment of a bending process in the thermoplastic tube bending method according to the present invention, (a) being a diagram illustrating a step in which a lower Z-direction forming mold is set, and (b) being a diagram illustrating a bending step in which the thermoplastic tube is bent in the Z direction.
Figure 5:
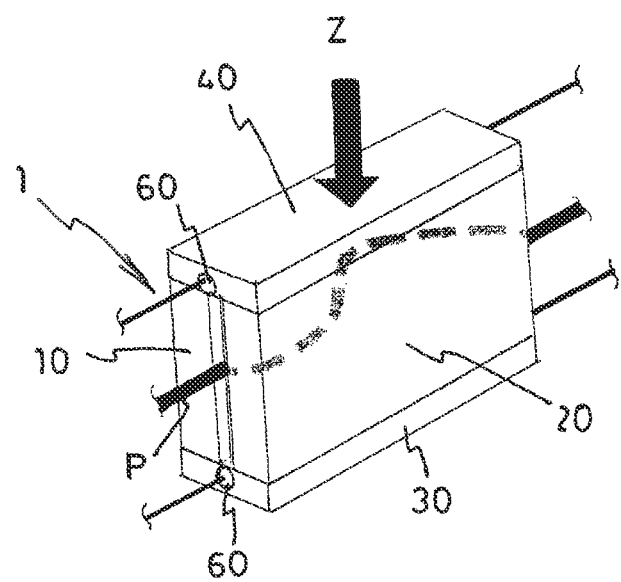

Next, the preheated thermoplastic tube P is bent, by operating the forming molds 10, 20, 30, and 40 as illustrated in FIG. 4 and FIG. 5. In this bending step S2 (see FIG. 7), first, the XY-plane forming molds 10 and 20 are clamped in the X direction by actuators (not shown) to sandwich the thermoplastic tube P between the forming surfaces 11 and 21 of the XY-plane forming molds 10 and 20, to bend the thermoplastic tube P in the X and Y directions (see FIG. 4(*b*)). Next, the lower forming mold 30 of the pair of Z-direction forming molds 30 and 40 is clamped in the Z direction by an actuator (not shown), to place the lower Z-direction forming mold 30 inside the cavity defined between the opposite forming surfaces 11 and 21 of the pair of closed XY-plane forming molds 10 and 20 (see FIG. 5(*a*)). Next, the upper Z-direction forming mold 40 is clamped in the Z direction by an actuator (not shown) to sandwich the thermoplastic tube P between the forming recesses 31 and 41 respectively formed on the opposing distal end surfaces of the pair of Z-direction forming molds 30 and 40, to bend the thermoplastic tube P in the Z direction into the final product shape of the thermoplastic tube P (see FIG. 5(*b*)). The operations described above may be carried out substantially at the same time to bend the thermoplastic tube P by the forming molds 10, 20, 30, and 40 almost simultaneously from each direction. At this time, the electric heaters 60 embedded in the forming mold may be powered to raise the temperature of the thermoplastic tube P while performing the bending process.

Figure 6:
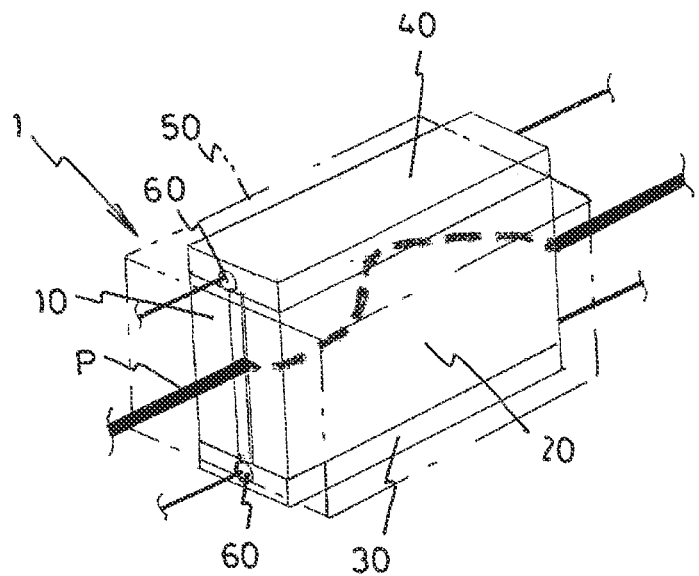
FIG. 6 is a perspective view of a conceptual illustration of one embodiment of a forming process in the thermoplastic tube bending method according to the present invention, (a) being a diagram illustrating a step in which, with a thermoplastic tube that has been bent in the forming mold being held, the temperature is raised (to heat the tube), and (b) being a diagram illustrating a step in which, with only the Z-direction forming mold being opened, the thermoplastic tube that has been bent by the XY-plane forming molds is held, and the temperature is gradually lowered (to cool down the tube).
Figure 6:
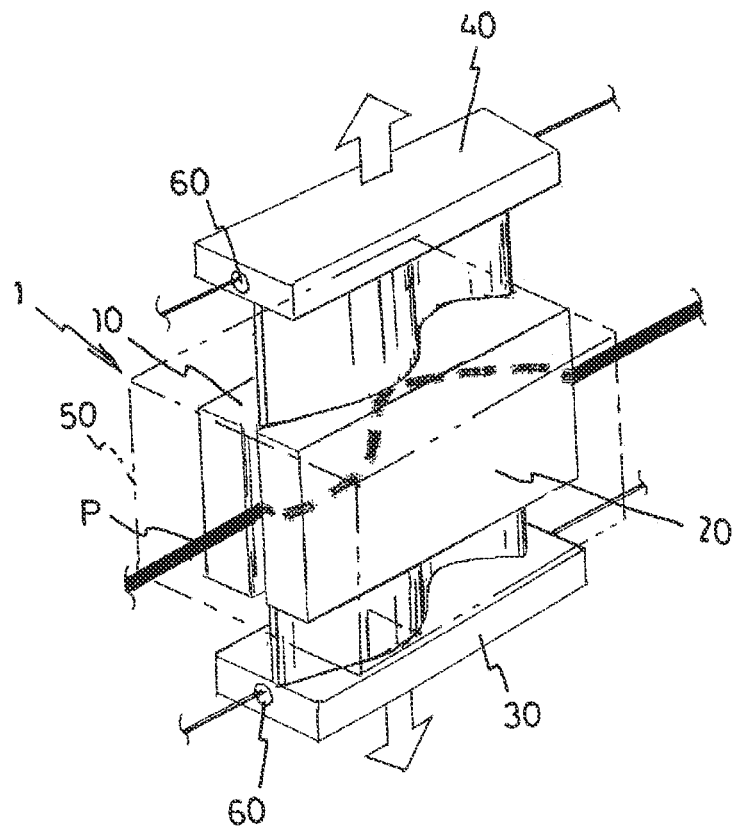

Next, the bent thermoplastic tube P undergoes a forming step, wherein the tube is heated in a state where its shape is retained in the forming mold 1 as illustrated in FIG. 6. This forming step S3 (see FIG. 7) is performed with an aim to reduce the springback after the bending of the thermoplastic tube P that has been bent. The present invention is characterized in that this forming step S3 is performed by temperature control of the electric heaters 60 embedded in the forming mold 1. This, with the electric heaters 60 capable of accurate and rapid temperature control, allows for efficient, safe, and precise forming of the thermoplastic tube P in a short time.

In the forming step S3, with an aim to reduce the springback after the bending, the thermoplastic tube P that has been bent is held at the crystallization temperature or higher and the melting-point temperature or less for a predetermined time by the temperature control of the electric heaters 60. This accelerates crystallization of the thermoplastic tube P, so that the resultant thermoplastic tube P shows less springback after the bending. The crystallization temperature here refers to the temperature at an exothermic peak during crystallization as the temperature decreases, which is observed in thermal analysis using differential scanning calorimetry (DSC) ("exothermic peak during crystallization" in FIG. 7). The melting point here refers to the temperature at an endothermic peak during fusion as the temperature increases, which is observed in thermal analysis using differential scanning calorimetry (DSC) ("endothermic peak during fusion" in FIG. 7).

The temperature at this forming step S3 is suitably set in accordance with specifics of the resin material of the thermoplastic tube P. When a polyamide resin such as nylon is employed as the resin material, for example, the temperature is 100° C. or more and 200° C. or less, preferably 120° C. or more and 180° C. or less, and more preferably 130° C. or more and 170° C. or less. The holding time is also suitably set in accordance with specifics of the resin material of the thermoplastic tube P. When a polyamide resin such as nylon is employed as the resin material, for example, the holding time is 150 seconds or more, preferably 160 seconds or more and 600 seconds or less, and more preferably 180 seconds or more and 400 seconds or less.

When the thermoplastic tube P is made of different resin materials and has a multilayered structure, the temperature and holding time in the forming step described above should preferably be set with reference to the properties of the resin material constituting the thickest layer that affects the shape change most. The temperature is set to a level at least equal to or lower than the melting point of the resin material having the lowest melting point.

The forming step S3 includes a step in which the thermoplastic tube P that has been bent is heated or held at the crystallization temperature or higher and the melting-point temperature or less by temperature control of the electric heaters 60 (step "S3a" in FIG. 7), and also a step in which the tube is gradually cooled down (step "S3b" in FIG. 7). In terms of reducing springback after the bending by accelerating crystallization in a short time, in particular, the step of gradually decreasing the temperature of the thermoplastic tube P at the crystallization temperature or higher and the melting-point temperature or less is important (cooling step "S3b" in FIG. 7). The rate of decreasing the temperature in this cooling step S3b is suitably set in accordance with specifics of the resin material of the thermoplastic tube P. When a polyamide resin such as nylon is employed as the resin material, for example, the temperature decrease rate is preferably 7° C./min or less, and more preferably 2° C./min or more and 5° C./min or less. The duration of the cooling step S3b is also suitably set in accordance with specifics of the resin material of the thermoplastic tube P. When a polyamide resin such as nylon is employed as the resin material, for example, the duration is preferably 130 seconds or more, and more preferably 150 seconds or more and 300 seconds or less.

FIG. 6(a) is a diagram illustrating execution of the step in which the thermoplastic tube P is heated or held at the crystallization temperature or higher and the melting-point temperature or lower (heating step "S3a" in FIG. 7) by switching on the electric heaters 60, or by repeatedly switching on and off the electric heaters 60, with the thermoplastic tube P being held after it has been bent by the forming molds 10, 20, 30, and 40. FIG. 6(b) is a diagram illustrating execution of the step in which the thermoplastic tube P is gradually cooled down at the crystallization temperature or higher and the melting-point temperature or less (cooling step "S3b" in FIG. 7) by switching off the electric heaters 60, or by repeatedly switching on and off the electric heaters 60, with the Z-direction forming molds 30 and 40 alone being opened and the thermoplastic tube P being held after it has been bent by the XY-plane forming molds 10 and 20.

Next, the formed thermoplastic tube P proceeds to the next cooling step S4 (see FIG. 7). In this cooling step S4, the thermoplastic tube P after the previous forming step S3 is cooled down to a temperature below the glass-transition temperature, to solidify the bent shape. The cooling method is not limited to a particular one, and any method whereby the formed thermoplastic tube P is removed from the forming mold 1, and transferred to a simple-shaped fixing mold so that the tube is naturally cooled, may be adopted, for example.

With the thermoplastic tube bending method described above, the thermoplastic tube P heated with the residual heat of the forming mold 1 can be bent precisely when held between the forming molds 10, 20, 30, and 40. The thermoplastic tube P that has been bent then undergoes the forming process by the temperature control of the electric heaters 60 provided to the forming mold 1 in the state in which the tube is retained in shape in the forming mold 1. The temperature can therefore be raised quickly and controlled accurately, so that precise forming of the thermoplastic tube P is possible in a short time. The forming step, in particular, where the thermoplastic tube P that has been bent is held at the crystallization temperature or higher and the melting-point temperature or less for a predetermined time by the temperature control of the electric heaters 60, accelerates crystallization of the thermoplastic tube P, which allows bending with little springback afterwards to be readily realized, and thermoplastic tubes with a good shape quality to be achieved.

While the thermoplastic tube bending method according to the present invention has been described in detail above, it goes without saying that the present invention is not only applicable to the embodiment described above as one example here but also can be embodied as a method using forming molds and the like in other forms based on the same technical concept.

Figure 8:
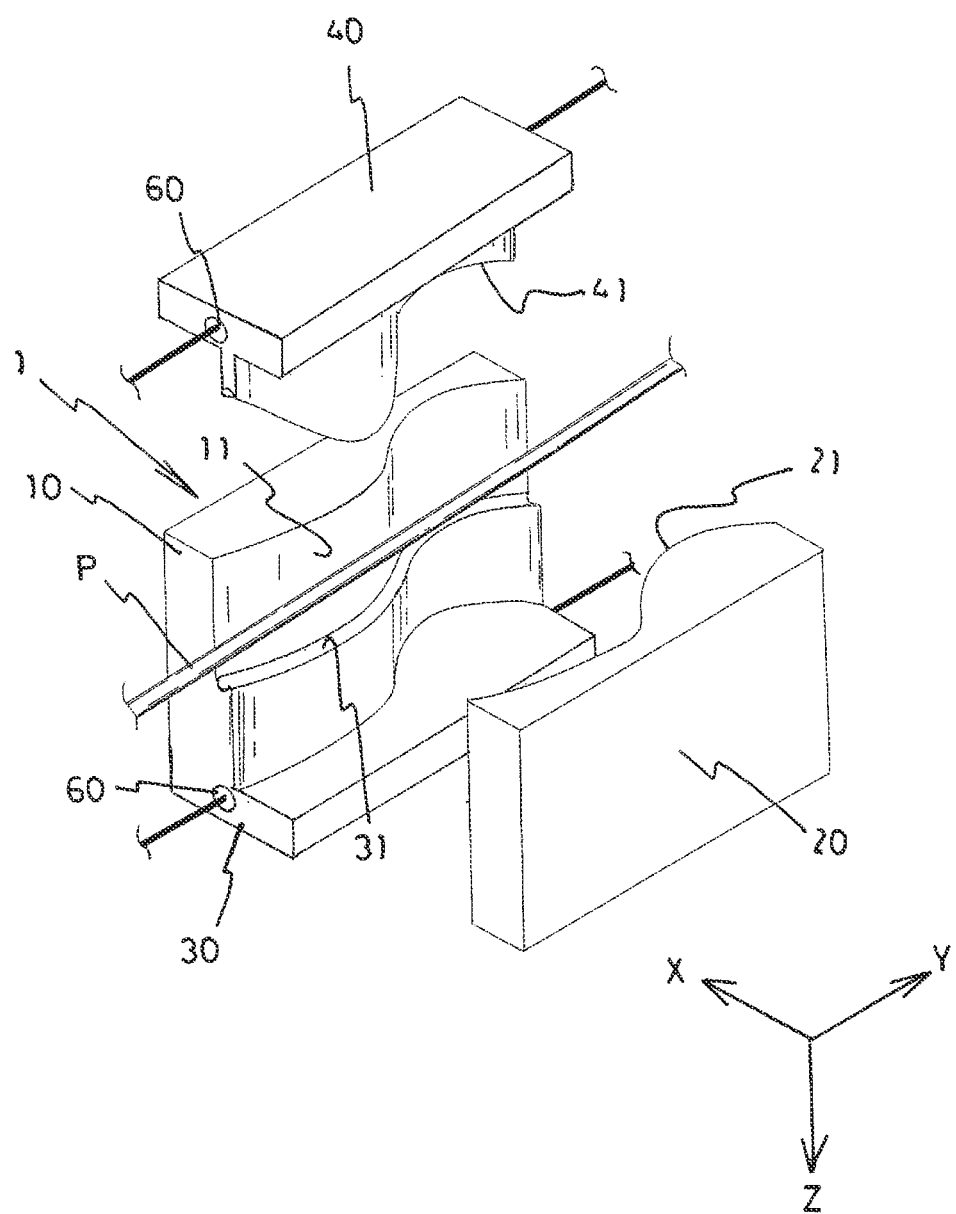
FIG. 8 is an exploded perspective view of a conceptual illustration of a variation example of the forming mold used in the thermoplastic tube bending method according to the present invention.

For example, the forming mold may be composed of three components, as illustrated in FIG. 8. This forming mold 1 is configured such that the lower forming mold 30 of the Z-direction forming molds 30 and 40, which are clamped in the Z direction to bend the thermoplastic tube P in the Z direction, of the forming mold 1 according to the embodiment illustrated in FIG. 1, is integrally attached to the plate surface of one forming mold 10 of the XY-plane forming molds 10 and 20 that are clamped in the X direction to bend the thermoplastic tube P in the XY plane, i.e., it is substantially made up of three components. Therefore the configuration is even simpler.

The operation of this forming mold 1 involves only the clamping of the XY-plane forming molds 10 and 20 in the X direction and the clamping of the upper Z-direction forming mold 40 in the Z direction, so the operation control is made easier.

Figure 9:
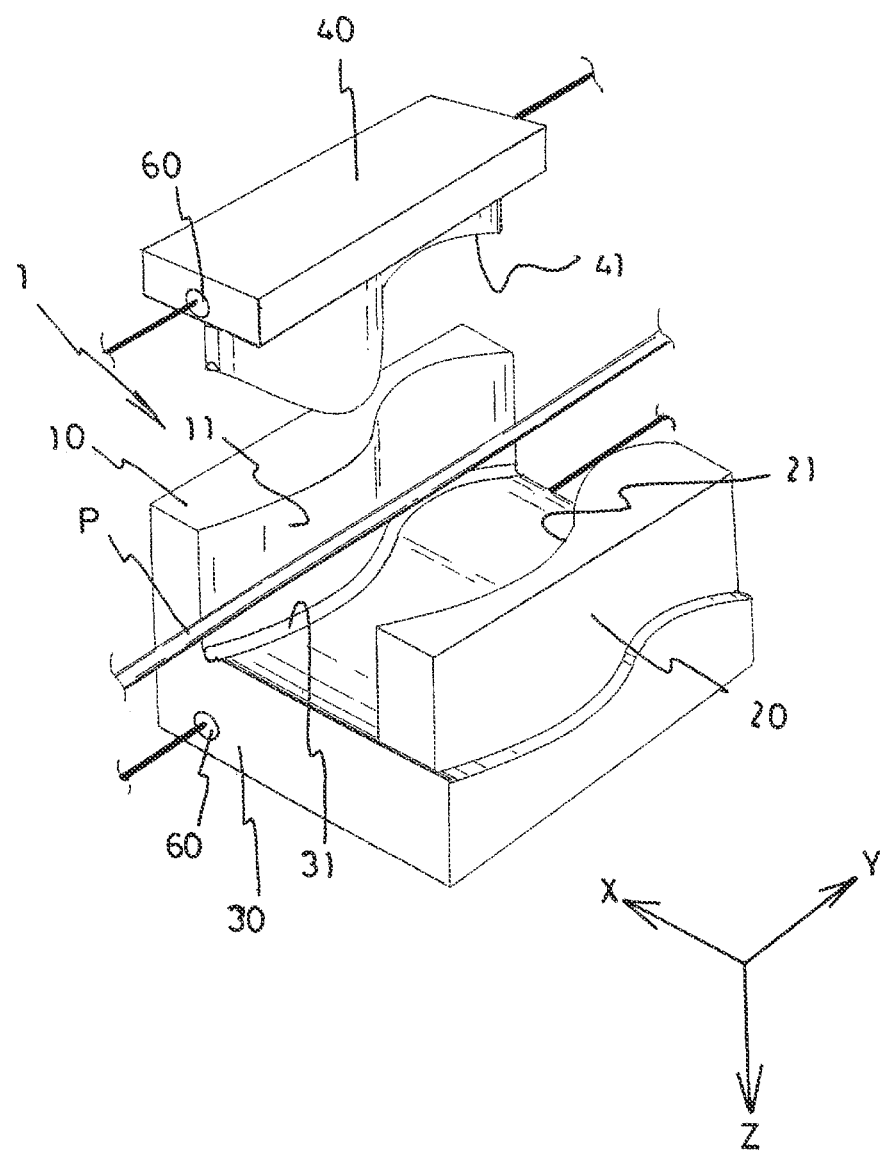
FIG. 9 is an exploded perspective view of a conceptual illustration of another variation example of the forming mold used in the thermoplastic tube bending method according to the present invention.

The forming mold may also be the one illustrated in FIG. 9. This forming mold 1 is configured as follows: the lower forming mold 30 of the Z-direction forming molds 30 and 40 of the forming mold 1 according to the embodiment illustrated in FIG. 1 is extended in the X direction and made thicker to serve as the base, this base-like lower Z-direction forming mold 30 being integrally attached to the plate surface of one forming mold 10 of the XY-plane forming molds 10 and 20. The other forming mold 20 of the XY-plane forming molds 10 and 20 has a lower end face curved in a shape conforming to that of the upper end face of the base-like lower Z-direction forming mold 30, and this XY-plane forming mold 20 with the curved lower end face is slid on the base-like lower Z-direction forming mold 30, so that the molds are clamped in the X direction.

The forming mold 1 with such a configuration provides similar effects as those of the forming mold illustrated in FIG. 8, and moreover, the base-like lower Z-direction forming mold 30 serves as the platform that supports the thermoplastic tube P being processed, which prevents the forming mold from biting into the thermoplastic tube P.

Figure 10:
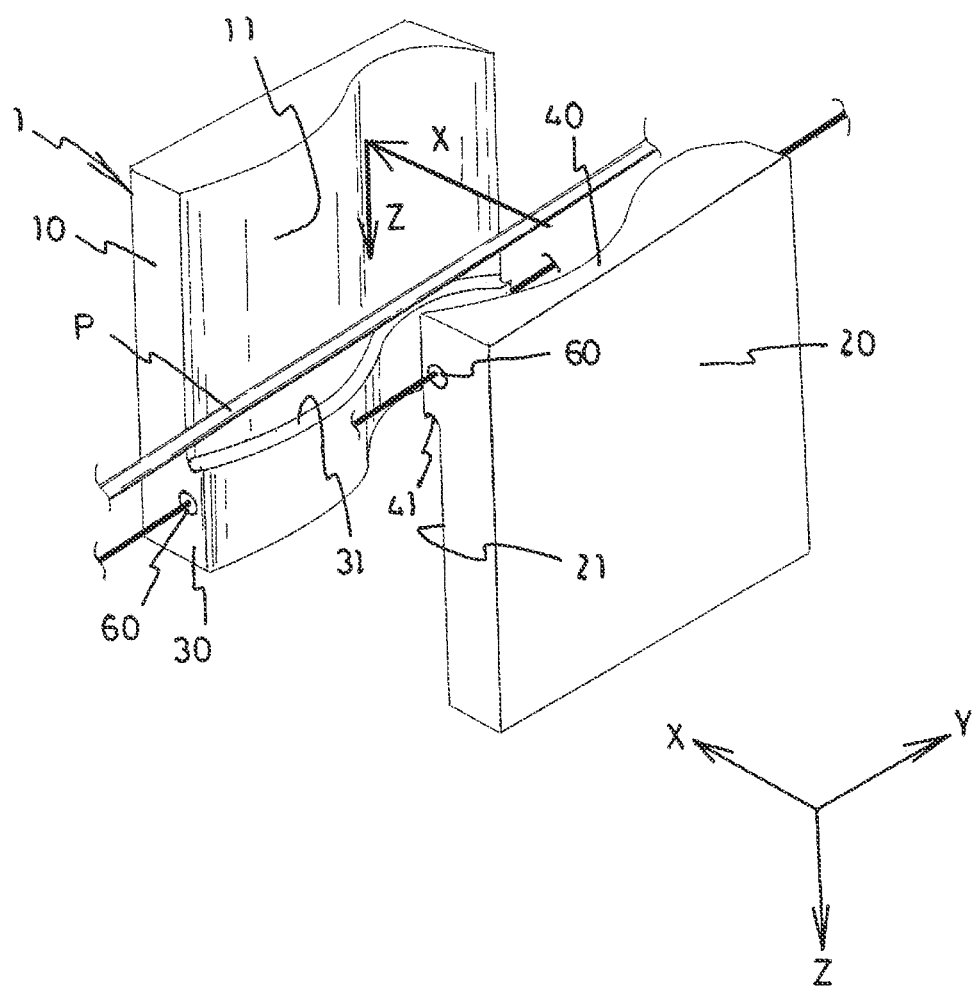
FIG. 10 is an exploded perspective view of a conceptual illustration of yet another variation example of the forming mold used in the thermoplastic tube bending method according to the present invention.

FIG. 10 shows a forming mold composed of two components. This forming mold 1 is configured such that the lower forming mold 30 of the Z-direction forming molds 30 and 40 of the forming mold 1 according to the embodiment illustrated in FIG. 1 is integrally attached to the lower plate surface of one forming mold 10 of the XY-plane forming molds 10 and 20, and the upper forming mold 40 of the Z-direction forming molds 30 and 40 is integrally attached to the upper plate surface of the other forming mold 20 of the XY-plane forming molds 10 and 20, i.e., it is substantially made up of two components. Therefore the configuration is even simpler.

This forming mold 1 is operated such that the other XY-plane forming mold 20 integrated with the upper Z-direction forming mold 40 is clamped in the X direction as indicated with the arrow in FIG. 10, and then the XY-plane forming mold 20 is moved in the Z direction, and therefore the operation control is made even easier.

Figure 11:
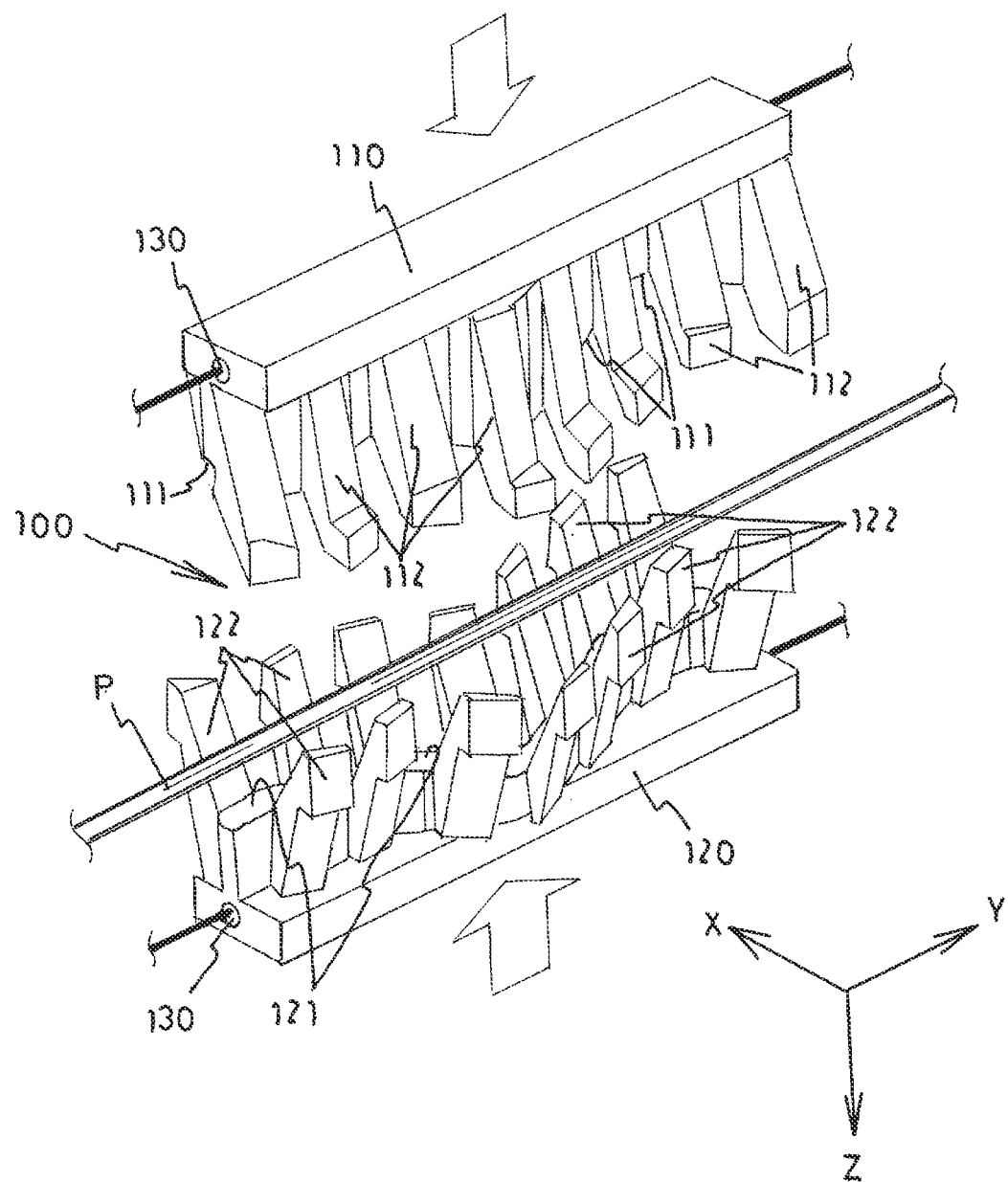
FIG. 11 is an exploded perspective view of a conceptual illustration of another example of the forming mold used in the thermoplastic tube bending method according to the present invention.
Figure 12:
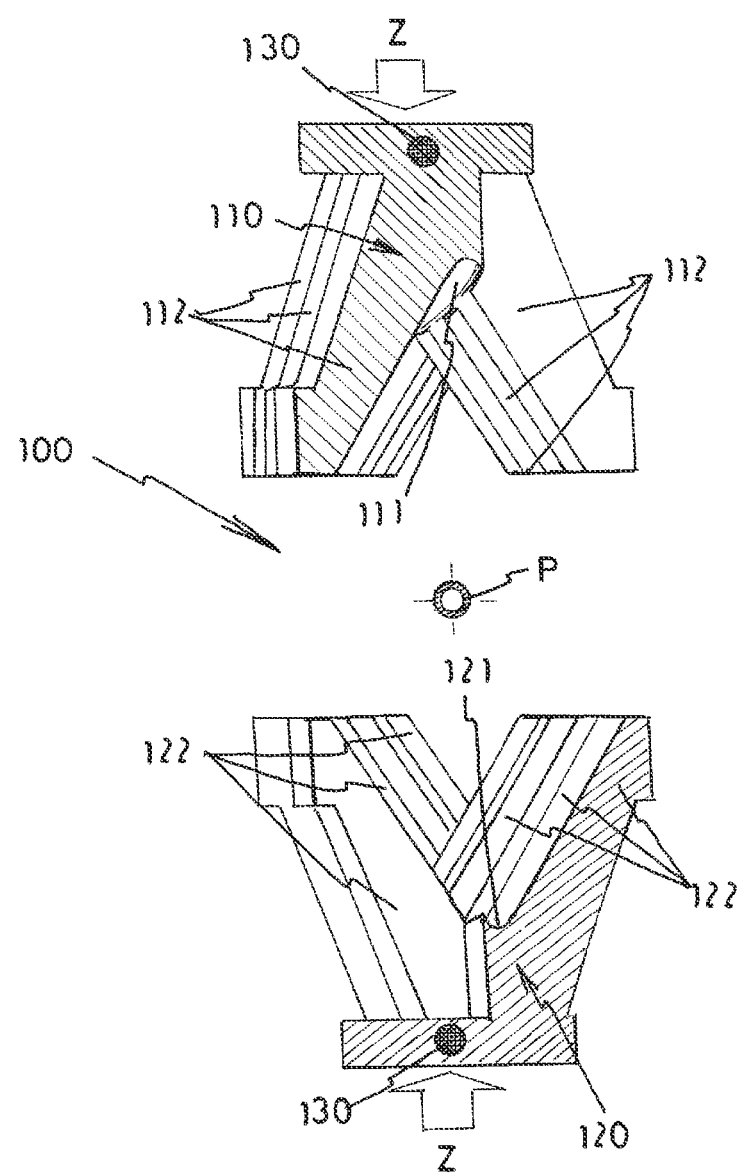
FIG. 12 is a conceptual cross-sectional view of major parts of the forming mold shown in FIG. 11.

Further, the bending may be performed using a forming mold 100 that has a completely different design from that of the forming mold 1 described above, as illustrated in FIG. 11 and FIG. 12. This forming mold 100 is made up of a pair of forming molds 110 and 120 that are clamped in the Z direction. The pair of forming molds 110 and 120 respectively include forming recesses 111 and 121, and guide parts 112 and 122 that guide the thermoplastic tube P into the forming recesses. The forming recesses 111 and 121 are each formed in a shape with a semi-circular cross section so that they define an elongated columnar cavity therebetween when the pair of forming molds are clamped for forming the thermoplastic tube P that is bent three dimensionally in X, Y, and Z directions. The guide parts 112 and 122 each extend outward in V-shape from both sides of the forming recesses with the semi-circular cross section. Temperature-controlled electric heaters 130 are embedded in respective base parts of the pair of forming molds 110 and 120.

Since this forming mold 100 has the guide parts 112 and 122 spread in V-shape, the thermoplastic tube P to be processed can be readily set into the forming mold 100. After being set, as the pair of forming molds 110 and 120 are clamped, the thermoplastic tube P is gradually bent along the slopes of the guide parts 112 and 122 and slides into the forming recesses 111 and 121, i.e., the thermoplastic tube P is fitted into the forming recesses 111 and 121 as it is bent also in directions other than the Z direction that is the mold clamping direction. When the forming mold 100 is completely closed, the thermoplastic tube P is entirely surrounded by the forming recesses 111 and 121 respectively formed on the pair of forming molds 110 and 120, and this way the thermoplastic tube P can be bent three dimensionally in the X, Y, and Z direction quickly and reliably.

INDUSTRIAL APPLICABILITY

With the thermoplastic tube bending method according to the present invention, thermoplastic tubes with less springback can be obtained in a short time and safe manner, and the method is therefore widely applicable to the bending of thermoplastic tubes, pipes and hoses that are used in particular as car components or the like.

REFERENCE SIGNS LIST

1 Forming mold
10, 20 XY-plane forming mold
11, 21 Forming surface
30, 40 Z-direction forming mold
31, 41 Forming recess
50 Thermal insulation wall
60 Electric heater
100 Forming mold
110, 120 Pair of forming molds clamped in the Z direction
111, 121 Forming recess
112, 122 Guide part
130 Electric heater
P Thermoplastic tube
S1 Preheating step
S2 Bending step
S3 Forming step
S4 Cooling step

The invention claimed is:

1. A thermoplastic tube bending method comprising:
a step of setting a thermoplastic tube in forming molds, which form a cavity having a predetermined shape defined therebetween when the forming molds are clamped,
wherein the forming molds include
first and second forming molds configured to be clamped in a Z direction, the first and second forming molds each comprising a forming recess, which when the first and second forming molds are in a clamped position define the cavity as a non-straight continuous columnar cavity elongated in a Y direction, and
a plurality of guides each spread in a V-shape sloping toward the forming recess, the plurality of guides are configured to engage the thermoplastic tube and guide the thermoplastic tube in an X direction and toward the forming recesses;
a step of closing a thermal insulation wall to prepare to use residual heat of the forming molds for preheating the thermoplastic tube, wherein the thermal insulation wall surrounds the forming molds;
a step of preheating the thermoplastic tube set in the forming molds closed in the thermal insulation wall using the residual heat of the forming molds so as to preheat a temperature of the thermoplastic tube to a predetermined temperature below a glass-transition temperature of a thermoplastic of the thermoplastic tube;
a step of bending the preheated thermoplastic tube to the predetermined shape by moving the forming molds to be clamped to make the cavity in which the thermoplastic tube is set have the predetermined shape;
a step of heat treatment of the bent thermoplastic tube for suppression of springback after cooling that is comprised of
a step of heating the bent thermoplastic tube in the cavity defined by the clamped forming molds, using a heater embedded in the forming molds;

a step of holding the temperature of the heated thermoplastic tube in the cavity at a temperature between a crystallization temperature and a melting-point temperature of the thermoplastic for a predetermined holding time; and a step of lowering the temperature of the heated thermoplastic tube in the cavity at a pre-set temperature decrease rate in a temperature range between the crystallization temperature and the melting-point temperature so as to accelerate crystallization of the thermoplastic; and a step of cooling the temperature of the thermoplastic tube to a temperature range below the crystallization temperature.

2. The thermoplastic tube bending method according to claim 1, wherein the step of preheating is carried out using heat from the heater which is embedded in the forming molds adding to the residual heat of the forming molds.

3. The thermoplastic tube bending method according to claim 1, wherein, during the step of lowering the temperature, the temperature of the heated thermoplastic tube is controlled to be decreased by an ON-OFF switching control of the heater.

4. The thermoplastic tube bending method according to claim 1, wherein the forming recesses are each formed in a shape with a semi-circular cross section, and the plurality of guides extend outward in the V-shape from both sides of the forming recesses.

5. The thermoplastic tube bending method according to claim 1, wherein the plurality of guides is formed as fingers configured to complement each other in the clamped forming molds.

6. The thermoplastic tube bending method according to claim 1, wherein the heater comprises temperature controlled electric heaters embedded in respective base parts of the first and second forming molds.

* * * * *